United States Patent
Musters et al.

(10) Patent No.: US 10,186,059 B2
(45) Date of Patent: Jan. 22, 2019

(54) RF SIGNAL REPRESENTATION USING PARTICLE BURSTS

(71) Applicant: L-3 Communications Corp., New York, NY (US)

(72) Inventors: Adrian Musters, Roy, UT (US); Thomas R. Giallorenzi, Sandy, UT (US); Joseph J. Booker, Draper, UT (US); Joe M. Brown, Glendale, CA (US); Dimitri Negroponte, Glendale, CA (US); Sam Leventer, Glendale, CA (US); Clinton B. Hope, Glendale, CA (US)

(73) Assignee: L3 Communications Corp., New York, NY (US)

( * ) Notice: Subject to any disclaimer, the term of this patent is extended or adjusted under 35 U.S.C. 154(b) by 126 days.

(21) Appl. No.: 15/268,193

(22) Filed: Sep. 16, 2016

(65) Prior Publication Data

US 2018/0083723 A1 Mar. 22, 2018

(51) Int. Cl.
*G06T 11/20* (2006.01)
*H04B 17/23* (2015.01)

(52) U.S. Cl.
CPC ............ *G06T 11/206* (2013.01); *H04B 17/23* (2015.01)

(58) Field of Classification Search
None
See application file for complete search history.

(56) References Cited

U.S. PATENT DOCUMENTS

| | | | |
|---|---|---|---|
| 2003/0071754 A1* | 4/2003 | McEwan | G01S 5/06 342/464 |
| 2006/0181243 A1* | 8/2006 | Graves | G16H 40/20 320/116 |
| 2010/0155620 A1* | 6/2010 | Hutchison | H01J 37/20 250/440.11 |
| 2014/0118116 A1* | 5/2014 | Lavedas | H01Q 1/2225 340/10.3 |
| 2015/0268926 A1* | 9/2015 | Panaiotis | G06F 3/167 715/716 |
| 2016/0367207 A1* | 12/2016 | Michaud | A61B 6/0457 |

* cited by examiner

*Primary Examiner* — Michelle Chin
(74) *Attorney, Agent, or Firm* — Workman Nydegger

(57) ABSTRACT

Embodiments are directed to representing radio frequency (RF) signals in a visualization using particle bursts. In one scenario, a computer system instantiates RF signal sources in a virtualization, where each RF signal source is configured to emit RF signals. The computer system then generates a stream of particle bursts to represent at least one of the emitted RF signals, and provides a visualization that shows the instantiated RF signal sources along with the generated particle bursts representing the emitted RF signals. In some cases, the visualization may be used to illustrate an anti-access, aerial denial (A2AD) environment. In other cases, the visualization may be used to illustrate network communications using particles, where each particle represents network data packets.

20 Claims, 12 Drawing Sheets

RF SIGNAL REPRESENTATION USING PARTICLE BURSTS

BACKGROUND

Computing systems have become ubiquitous in today's world. These computing systems can perform a wide variety of functions including processing software applications. In some cases, software applications have been used to create visualizations. For instance, software applications may be designed to simulate a field of particles. This field of particles may allow interaction from a user. The user may implement a mouse or a finger on a touchscreen to manipulate the field of particles. As the user clicks or touches parts of the field, the particles in that field may move in a corresponding manner (as if touching the surface of water). If the user clicks and drags the mouse cursor (or their finger) over the field of particles, the particles in the field will move as if being dragged by a physical force.

Many such visualizations are possible. In some cases, the visualizations may involve objects, people or environments. However, while showing some level of detail regarding physical reactions to user input, these visualization systems are limited in how they can show certain types of data. For instance, some data may be displayed in more than one way, and such systems may not have the capabilities to display the information in the most effective manner.

BRIEF SUMMARY

Embodiments described herein are directed to representing radio frequency (RF) signals in a visualization using particle streams or bursts. In one embodiment, a computer system simulates RF signal sources in a virtualization, where each RF signal source is configured to emit RF signals. The computer system then generates a stream of particle bursts to represent at least one of the emitted RF signals, and provides a visualization that shows the instantiated RF signal sources along with the generated particle bursts representing the emitted RF signals.

In another embodiment, a user interface is provided which includes a communication network. The communication network includes multiple network nodes and communication signals. Within the communication network, the communication signals travel between origin and destination endpoints. The communication signals comprise data packets. The user interface also includes inter-node communication pathways configured to carry the communication signals from the respective origins to the respective endpoints through the network nodes. The data packets are represented as particles in the user interface. As such, the particles are visualized as traveling from origin to destination endpoints through the network nodes.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
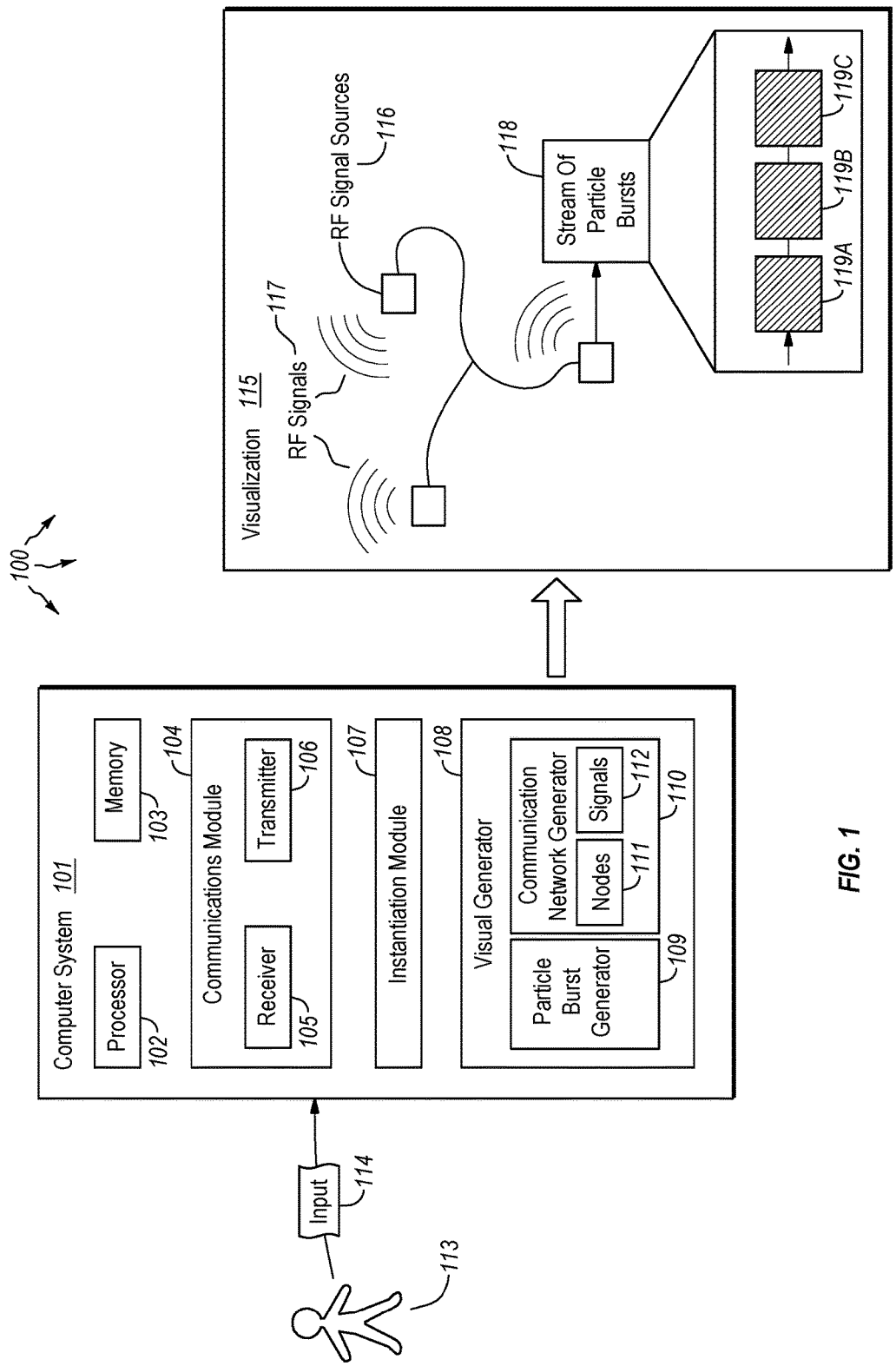
FIG. 1 illustrates a computer architecture in which embodiments described herein may operate including representing radio frequency (RF) signals in a visualization using particle streams or bursts.

Embodiments described herein are directed to representing radio frequency (RF) signals in a visualization using particle streams or bursts. In one embodiment, a computer system simulates RF signal sources in a virtualization, where each RF signal source is configured to emit RF signals. The computer system then generates a stream of particle bursts to represent at least one of the emitted RF signals, and provides a visualization that shows the instantiated RF signal sources along with the generated particle bursts representing the emitted RF signals.

In another embodiment, a user interface is provided which includes a communication network. The communication network includes multiple network nodes and communication signals. Within the communication network, the communication signals travel between origin and destination endpoints. The communication signals comprise data packets. The user interface also includes inter-node communication pathways configured to carry the communication signals from the respective origins to the respective endpoints through the network nodes. The data packets are represented as particles in the user interface. As such, the particles are visualized as traveling from origin to destination endpoints through the network nodes.

The following discussion refers to a number of methods and method acts that may be performed by one or more embodiments of the subject matter disclosed herein. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may implement various types of computing systems. These computing systems are now increasingly taking a wide variety of forms. Computing systems may, for example, be mobile phones, electronic appliances, laptop computers, tablet computers, wearable devices, desktop computers, mainframes, and the like. As used herein, the term "computing system" includes any device, system, or combination thereof that includes at least one processor, and a physical and tangible computer-readable memory capable of having thereon computer-executable instructions that are executable by the processor. A computing system may be distributed over a network environment and may include multiple constituent computing systems.

A computing system typically includes at least one processing unit and memory. The memory may be physical system memory, which may be volatile, non-volatile, or some combination of the two. The term "memory" may also be used herein to refer to non-volatile mass storage such as physical storage media or physical storage devices. If the computing system is distributed, the processing, memory and/or storage capability may be distributed as well.

As used herein, the term "executable module" or "executable component" can refer to software objects, routines, methods, or similar computer-executable instructions that may be executed on the computing system. The different components, modules, engines, and services described herein may be implemented as objects or processes that execute on the computing system (e.g., as separate threads).

As described herein, a computing system may also contain communication channels that allow the computing system to communicate with other message processors over a wired or wireless network. Such communication channels may include hardware-based receivers, transmitters or transceivers, which are configured to receive data, transmit data or perform both.

Embodiments described herein also include physical computer-readable media for carrying or storing computer-executable instructions and/or data structures. Such computer-readable media can be any available physical media that can be accessed by a general-purpose or special-purpose computing system.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computing system to implement the disclosed functionality of the embodiments described herein. The data structures may include primitive types (e.g. character, double, floating-point), composite types (e.g. array, record, union, etc.), abstract data types (e.g. container, list, set, stack, tree, etc.), hashes, graphs or other any other types of data structures.

As used herein, computer-executable instructions comprise instructions and data which, when executed at one or more processors, cause a general-purpose computing system, special-purpose computing system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The embodiments herein may also be practiced in distributed system environments where local and remote computing systems, which are linked (either by hardwired data links, wireless data links, or by a combination of hardwired and wireless data links) through a network, both perform tasks. As such, in a distributed system environment, a computing system may include a plurality of constituent computing systems. In a distributed system environment, program modules may be located in both local and remote memory storage devices.

Those skilled in the art will also appreciate that the embodiments herein may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Referring to the figures, FIG. 1 illustrates a computer architecture 100 in which at least one embodiment described herein may be employed. The computer architecture 100 includes a computing system 101 with a hardware processor 102 and hardware memory 103. The computing system 101 may be any type of local or distributed computing system, including a cloud computing system. The computing system 101 includes modules for performing a variety of different functions. For instance, the communications module 104 may be configured to communicate with other computing systems. The communications module 104 may include any wired or wireless communication means including a receiver 105 that can receive data and/or a transmitter 106 that can transmit data to or from other computing systems. The communications module 104 may be configured to interact with databases, mobile computing devices (such as mobile phones or tablets), embedded or other types of computing systems.

The computer system 101 may be configured to generate visualizations such as visualization 115. As used herein, the term "visualization" refers to any interface, display or visual means of presenting information. In some cases, the visualization 115 may be displayed on a touchscreen display, a monitor, a television, a projector, or other means of displaying an electronic image. The visualization 115 may include different elements provided by the visualization generator 108. For example, the visualization 115 may include one or more radio frequency (RF) signal sources 116. Each of these RF signal sources 116 may be instantiated within the visualization 115 by the instantiation module 107 of computer system 101. The visualization 115 may be a static visualization, or may be dynamic such that it changes over time.

Indeed, in some embodiments, the visualization 115 shows the RF signal sources 116 in operation, as they are sending out signals carrying data. The RF signals 117 may be transmitted omnidirectionally, bidirectionally, unidirectionally, or in a steered manner, depending on the type of RF signal source (e.g. antenna) being used. The RF signals include photons or electromagnetic (EM) emissions. These photons or EM emissions are displayed as particles, particle streams or particle bursts in the visualization (as generally shown in FIGS. 2-10). For instance, a given RF signal source 116 may be transmitting data packets over a carrier signal emitted from the RF signal source. This RF signal is comprised of many different photons, each of which may be represented as a moving particle in the visualization 115. As these particles move at the speed of light in real life, the particles, particle streams or particle bursts shown in the visualization 115 may be substantially slowed to show the user (e.g. 113) what is happening in a given scenario.

Figure 2:
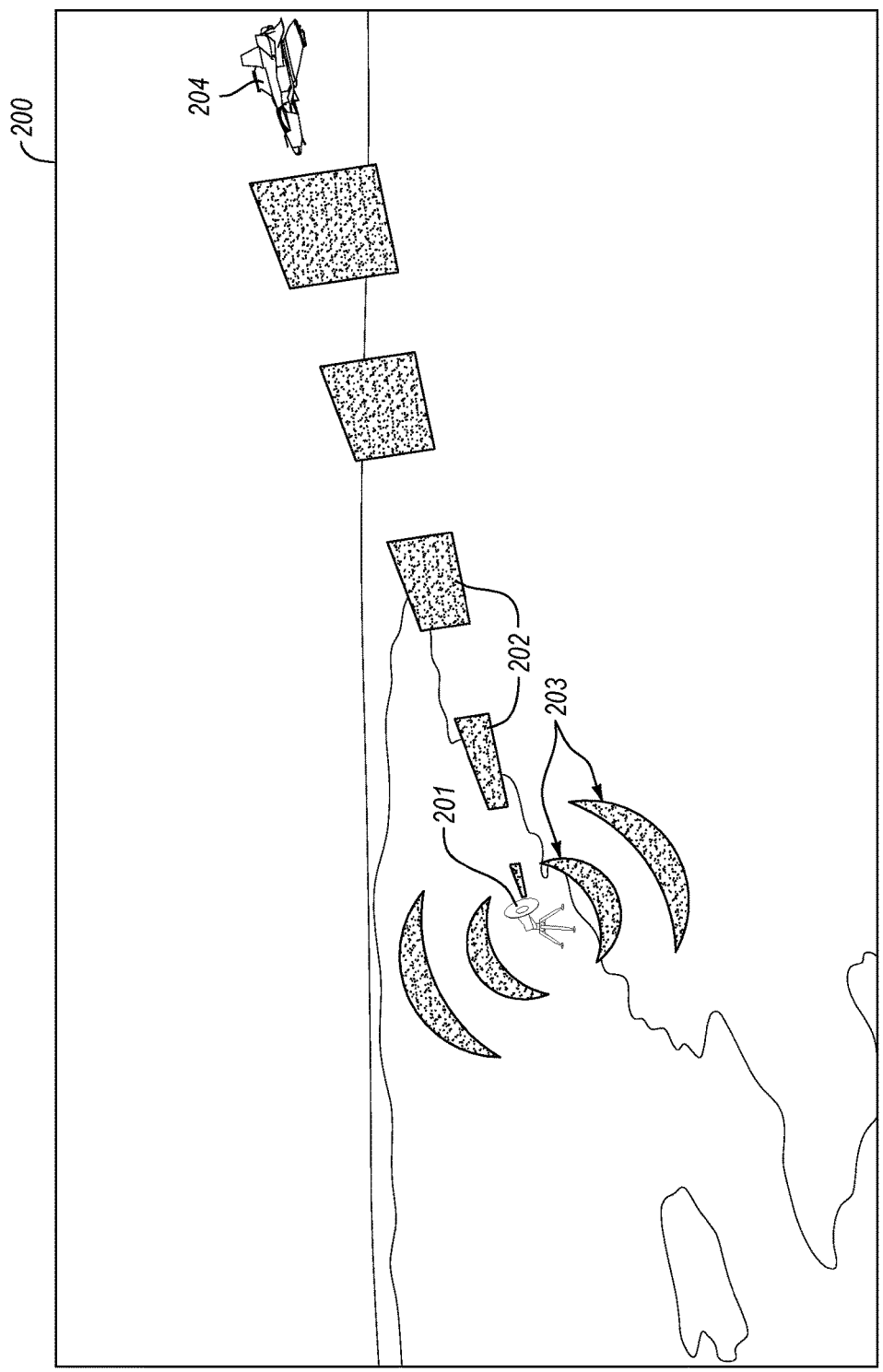
FIG. 2 illustrates an embodiment in which an RF signal is represented as a plurality of particle bursts.

For instance, in one embodiment, a battlefield scenario may be illustrated in the visualization 115. As shown in FIG. 2, a signal source such as a pulse jammer 201 may send out dense bursts of particles 202 that fly toward the airplane 204. The bursts of particles are emitted from the antenna of the signal source. Depending on the type of antenna used, more or fewer particles may be transmitted in any one direction from the RF signal source 201.

In the embodiment shown in FIG. 2, a smaller number of particles are emitted out of the antenna sidelobes 203. In the visualization 200, virtually any type of background image or setting may be illustrated. In this particular embodiment, a land mass is depicted, with a single RF signal source instantiated thereon. One will understand, of course, that substantially any number of RF signal sources may be illustrated in the visualization 115. Moreover, the visualization generator 108 may take into account interference and other physical factors that may attenuate or distort signals. These attenuations and distortions may, additionally or alternatively, be shown in some embodiments of the visualization.

In FIG. 2, the airplane 204 is about to enter or intersect with the stream of particle bursts 202. In cases where the RF signal source 201 is a jammer, certain functionality of the plane's radios may be lost. As shown in visualization 300 of FIG. 3, graphs 301 and 302 may be provided which show the aircraft's perspective when it reaches the particle bursts 202. Graph 301 illustrates, on the x-axis, an indication of data rate, and on the y-axis, an indication of jammer-to-signal strength ratio. The airplane is indicated as currently being in the unjammed region, with a current data rate of around 80 kbps. In the jammed region, the jammer is stronger than the signal strength of the airplane's radios and, as such, data transmissions from the airplane would be prevented. In graph 302, frequency is shown on the x-axis, energy level is shown on the y-axis, and time is shown on the z-axis.

As particle bursts 202 bombard the aircraft 204, particle bursts appear on the spectrum plot of graph 302, synchronized with the particle bursts. Accordingly, above the noise floor, each pulse jamming particle burst is shown as time progresses on the z-axis. In graph 302, the level of energy is shown as being constant, although the level of energy could vary depending on a variety of different factors including attenuation, deflection and diffraction. The effects of attenuation, deflection and diffraction on the signal may be represented visually in the diagram 300. For instance, the RF signal emitted from the RF signal source 201 may attenuate over time, and may be more spread out the farther it travels from the signal source. Similarly, if the signal is deflected or diffracted off of a nearby building, tree, cloud, airplane or other object, that deflected or diffracted signal may be illustrated in the diagram. The deflected or diffracted signal may be shown with fewer particles, or different colored particles to signify that they have undergone a change.

Furthermore, the particles may be animated as being sparser due to attenuation, or traveling in a different direction due to deflection, etc. In one embodiment, the particle streams may be animated as falling off at a rate of $1/r^2$, where the particle stream decreases in density as it loses signal strength. Such animations may occur in 2D or 3D space. Other effects and changes to the signal that result from natural, physical processes may also be illustrated in the visualization. Accordingly, it can be seen that real-world physical effects on the signal are taken into account, and can be represented as particles or streams of particles in the visualization 300. These physical effects may be updated dynamically as changes in the simulated environment occur (e.g as planes fly around, reflections off of the planes may be illustrated as particles reflecting away from the planes).

The pulse jamming signal 202 is shown as being a constant frequency signal. This may also vary in other embodiments, especially in cases where the signal source 201 is a different type of antenna such as a cell tower or other communication antenna. In some embodiments, the graphs 301 and 302 may be shown upon selecting the aircraft 204 in a graphical user interface (GUI). For instance, user 113 may select the aircraft 204 using input 114. The input may be via touchscreen, mouse, keyboard, gestures, voice commands or other form of input. As such, using the GUI, the user 113 may interact with different elements shown in the visualization including signal sources and objects that interact with the signals.

Figure 3:
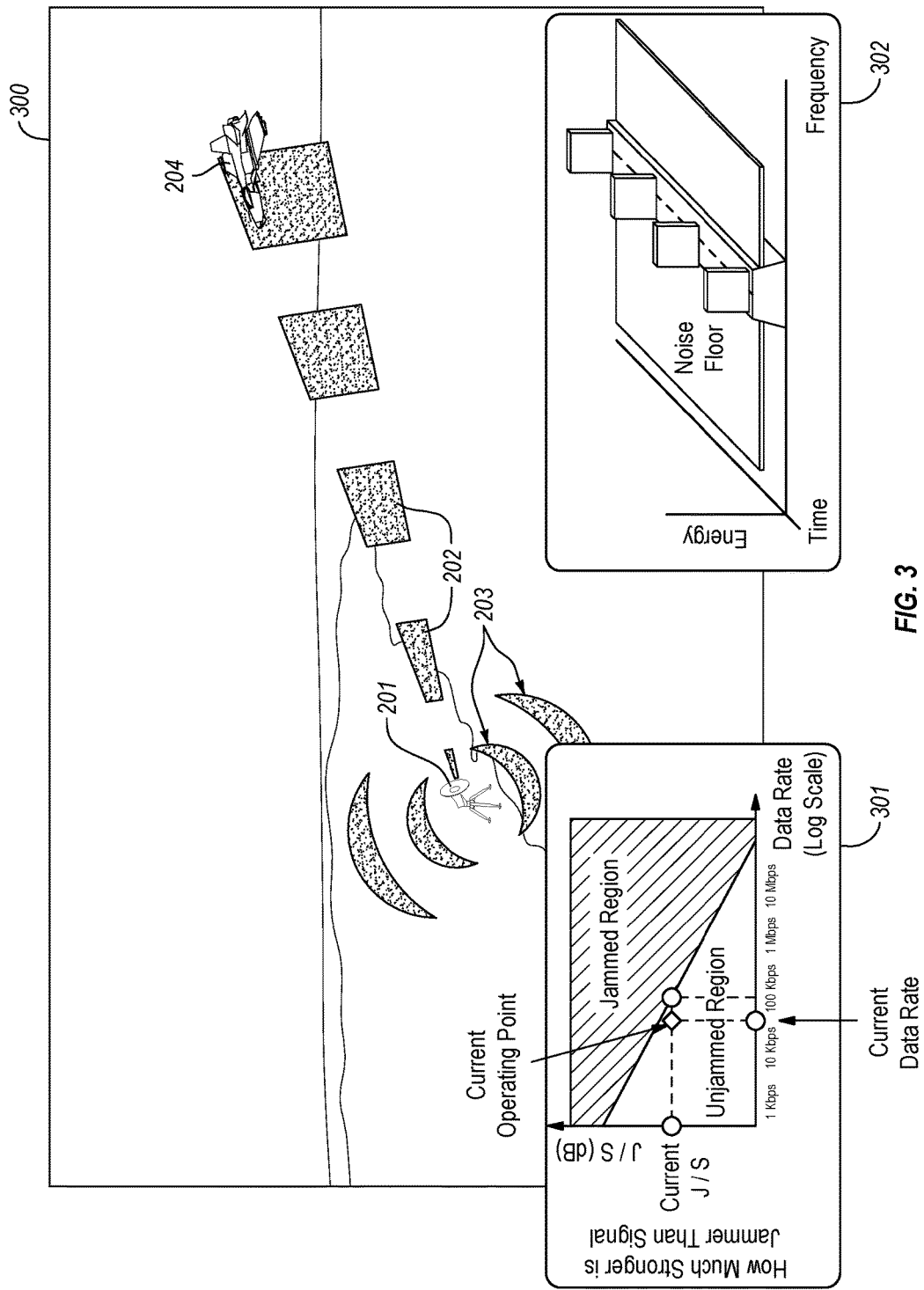
FIG. 3 illustrates an embodiment in which an aircraft intersects the plurality of particle bursts and graphs are illustrated in the visualization.
Figure 4:
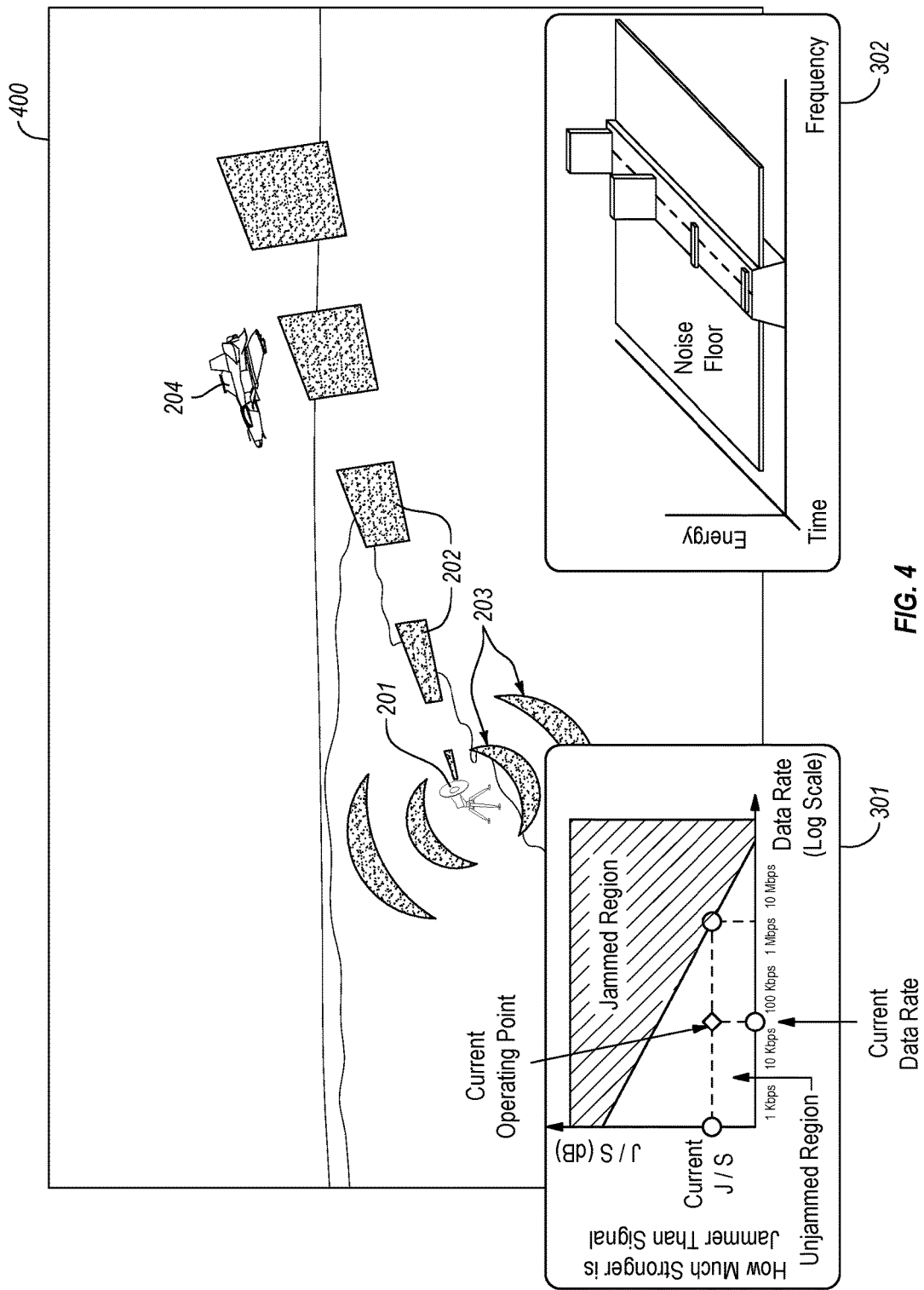
FIG. 4 illustrates an embodiment in which the aircraft flies out of the plurality of particle bursts and updated graphs are illustrated in the visualization.

FIG. 4 illustrates a subsequent point in time in relation to FIG. 3. In visualization 400 of FIG. 4, the airplane 204 has now flown out of the main beam of the jammer 201, and is hit with far fewer particles, such as those coming from the sidelobes 203 of the jammer antenna. As can be seen in the spectral plot of graph 302 of visualization 400, as time has passed on the z-axis, the level of energy (y-axis) has dropped significantly now that the airplane has passed out of the main beam of the jammer 201.

Similarly, in graph 301, it can be seen that the current jammer-to-signal rate has dropped significantly, although the data rate remains unchanged. These graphs may adjust in real time, synchronized with the display in the background (in this case, an airplane flying through a jammer's signal). It will be understood, of course, that the airplane and jammer scenario is just one of many scenarios in which RF signals may be represented using streams of particles or particle bursts. Indeed, any scenario in which a signal source is provided, and in which elements or objects interact with that signal source, may be illustrated in the visualization.

Figure 5:
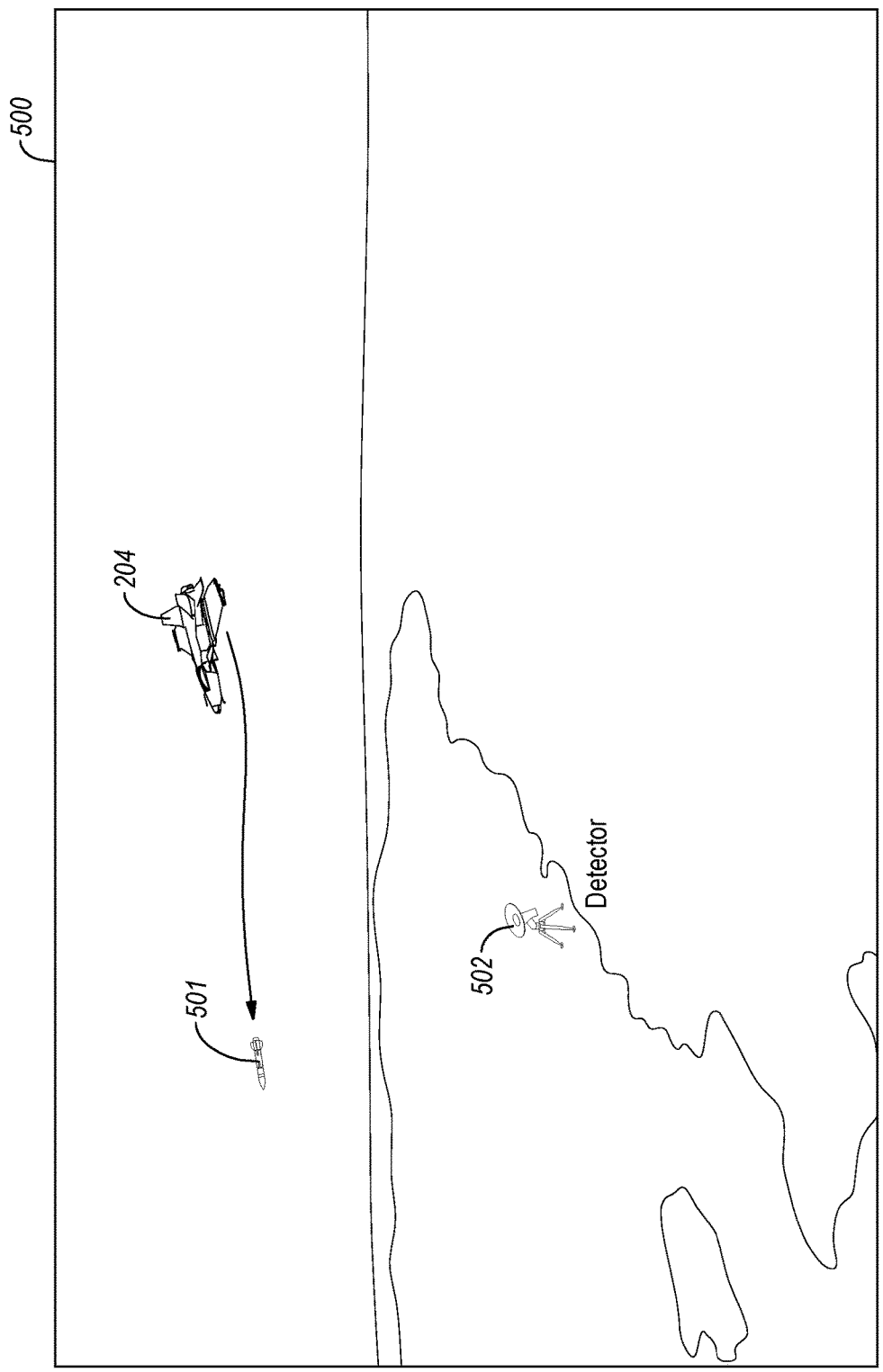
FIG. 5 illustrates an embodiment in which an aircraft launches a weapon over a detector device.
Figure 6:
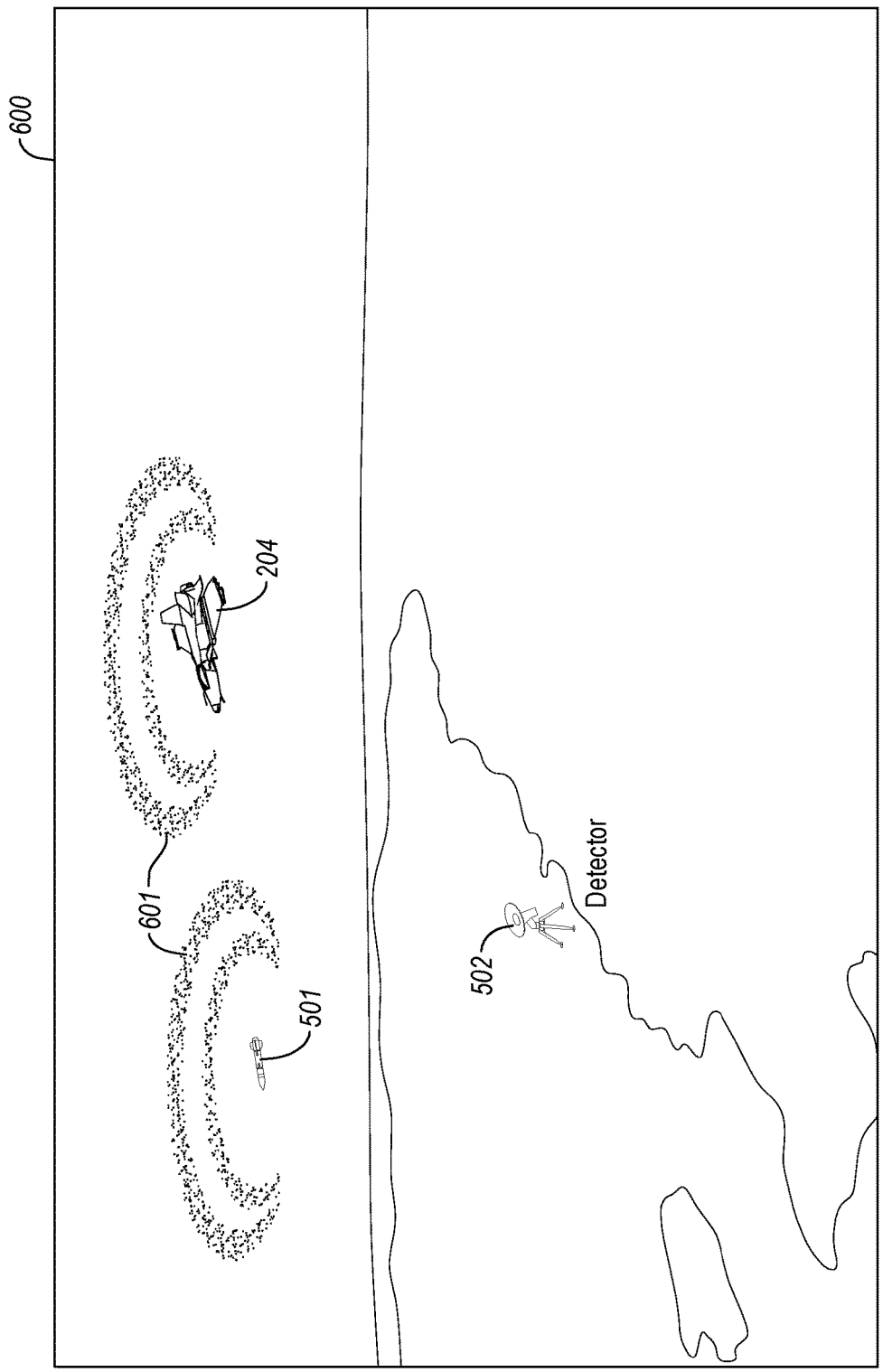
FIG. 6 illustrates an embodiment in which the aircraft and the weapon communicate, shown in the rings of particles.

Visualization 500 of FIG. 5 illustrates an embodiment involving low probability of detection (LPD) communication systems. For instance, in FIG. 5, an airplane (which may be airplane 204 from FIG. 2) launches a weapon 501 such as a missile. A detector device 502 may be positioned on the ground in the visualization 500. The detector device 502 may be configured to monitor for communications or other signs of aerial weapons or aerial communication devices. As shown in FIG. 6, visualization 600 illustrates that the weapon 501 and the airplane 204 communicate with each. This is illustrated using particles emanating from each platform, as shown by the circular rings of particles 601. Most of the particles emitted from the weapon 501 and the airplane 204 will travel sideways, or outward from each respective platform. A few of the particles, however, will diffract over or under the platforms and will rain down onto the ground, perhaps resembling glowing embers from a firework in the visualization 600. These diffracted particles may be detected by the detector device 502.

Figure 7:
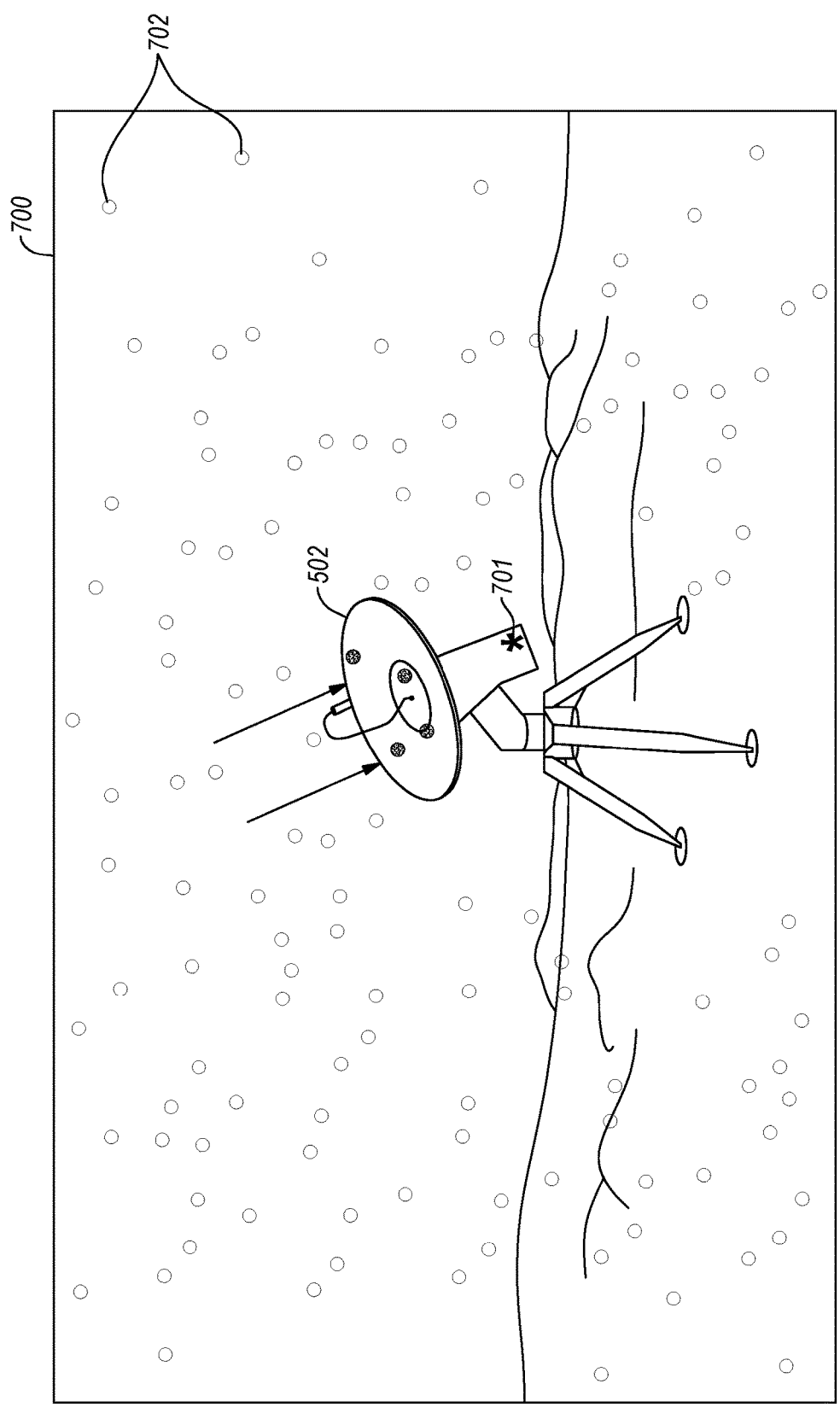
FIG. 7 illustrates an embodiment in which particles rain down on a detector device.
Figure 8:
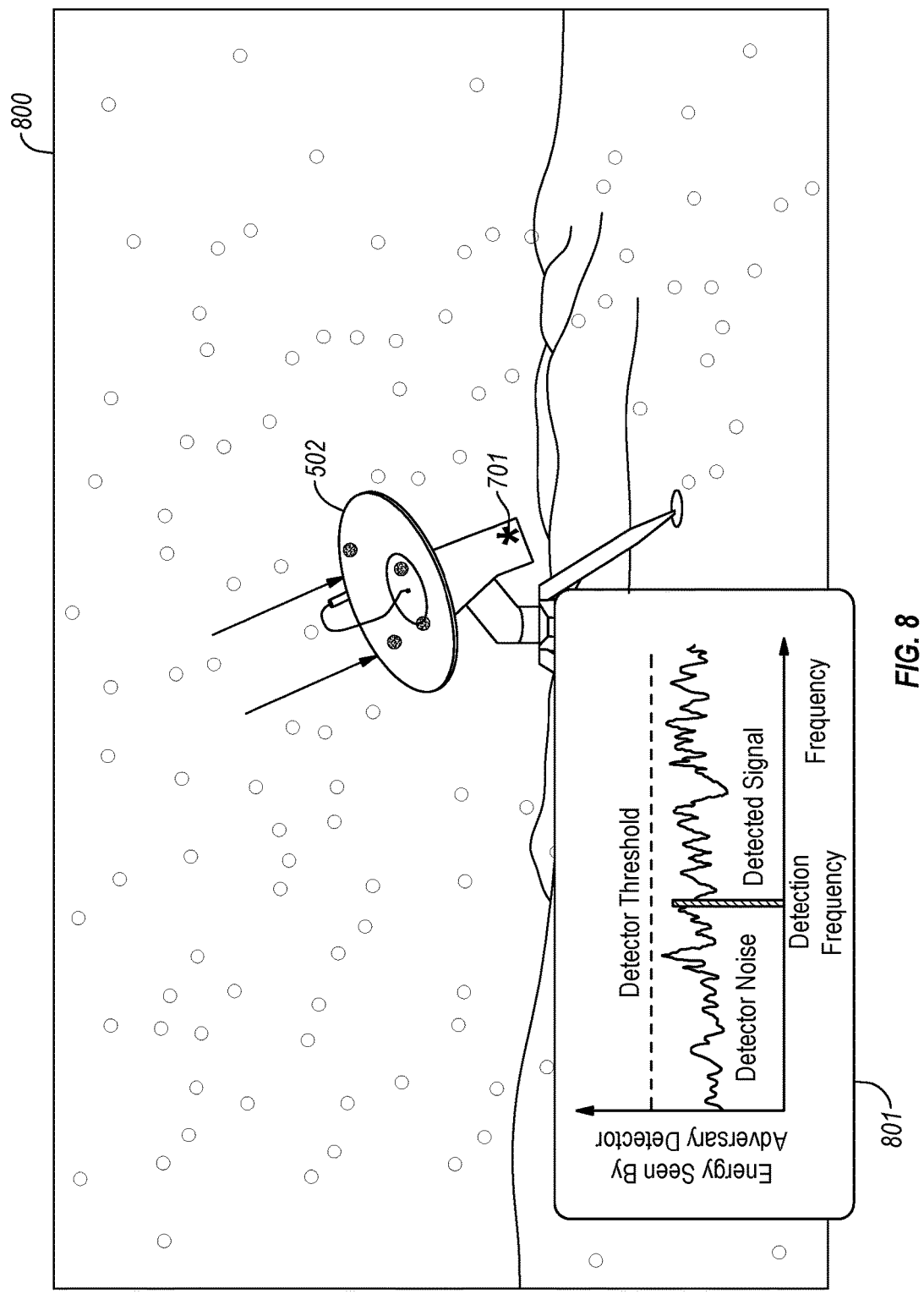
FIG. 8 illustrates an embodiment in which particles rain down on the detector device, and a graph is illustrated in the visualization.

Indeed, as shown in FIG. 7, visualization 700 illustrates particles 702 representing photons from the airplane's transmitters (or from the weapon's transmitters). In the visualization 700, these photons may appear to be raining or drizzling down to the ground. The detector device (e.g. a receiver dish) may catch a few of the particles 702, and if the number of detected particles is significant, an indicator light 701 may fire, indicating that something has been detected. In visualization 800 of FIG. 8, a graph 801 is shown which illustrates, on the x-axis, a detection frequency, and on the y-axis, the amount of energy detected by the detector device 502. If the amount of energy seen from the particles 702 is not enough to surpass the detector threshold, the detector will indicate that no object or communications have been detected. Alternatively, if the detector dish catches enough of the particles, an alarm may be sounded or data may be transmitted to an appropriate party.

Figure 9:
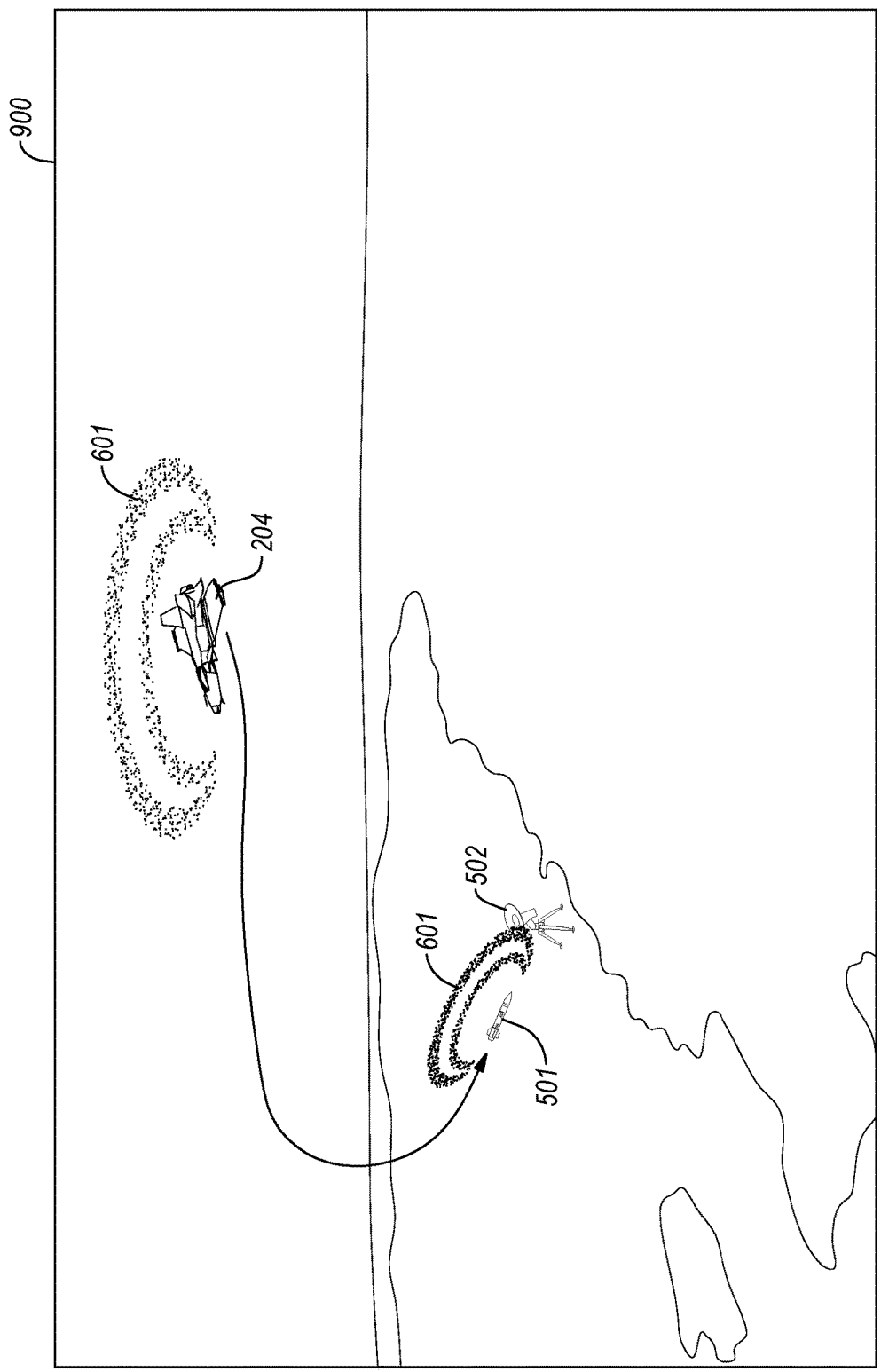
FIG. 9 illustrates an embodiment in which the weapon turns to head for the detector device, thereby increasing signal energy transmitted to the detector device.
Figure 10:
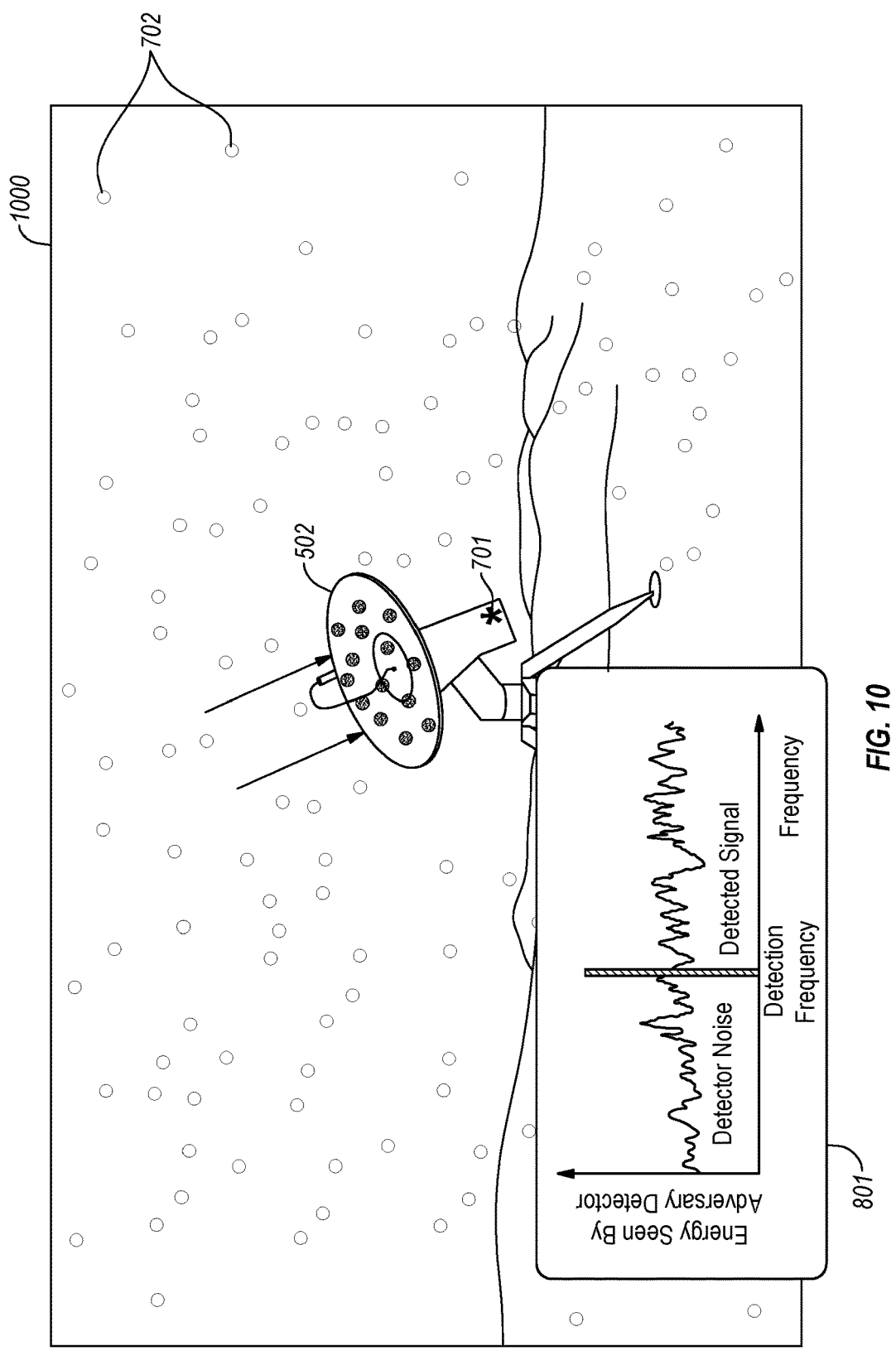
FIG. 10 illustrates an embodiment in which particles rain down on the detector device, and an updated graph is illustrated in the visualization.

In visualization 900 of FIG. 9, the weapon 501 turns and heads for the detector 502, in an attempt to take out the detector. When the weapon orients itself for terminal impact, the signal particles spraying the detector increase. As shown in visualization 1000 of FIG. 10, the detector 502 is again shown in a close-up view. Many more particles 702 are shown as raining down on the detector. The superimposed graph 801 shows that if enough particles have hit the detector then a signal has been detected. The visualization 1000 may then show an illustration of the detector being destroyed.

Again, it will be appreciated that this airplane and detector example is just one of many different types of examples where particles may be used to show RF emissions. For instance, particles may be used to show communication signals being passed from cell phones to cell towers, or from mobile devices to WiFi routers, or from earth-based transceivers to orbiting satellites. Still further, as will be explained in greater detail below, particles may be used in visualizations to illustrate data traffic in a communications network.

Figure 11:
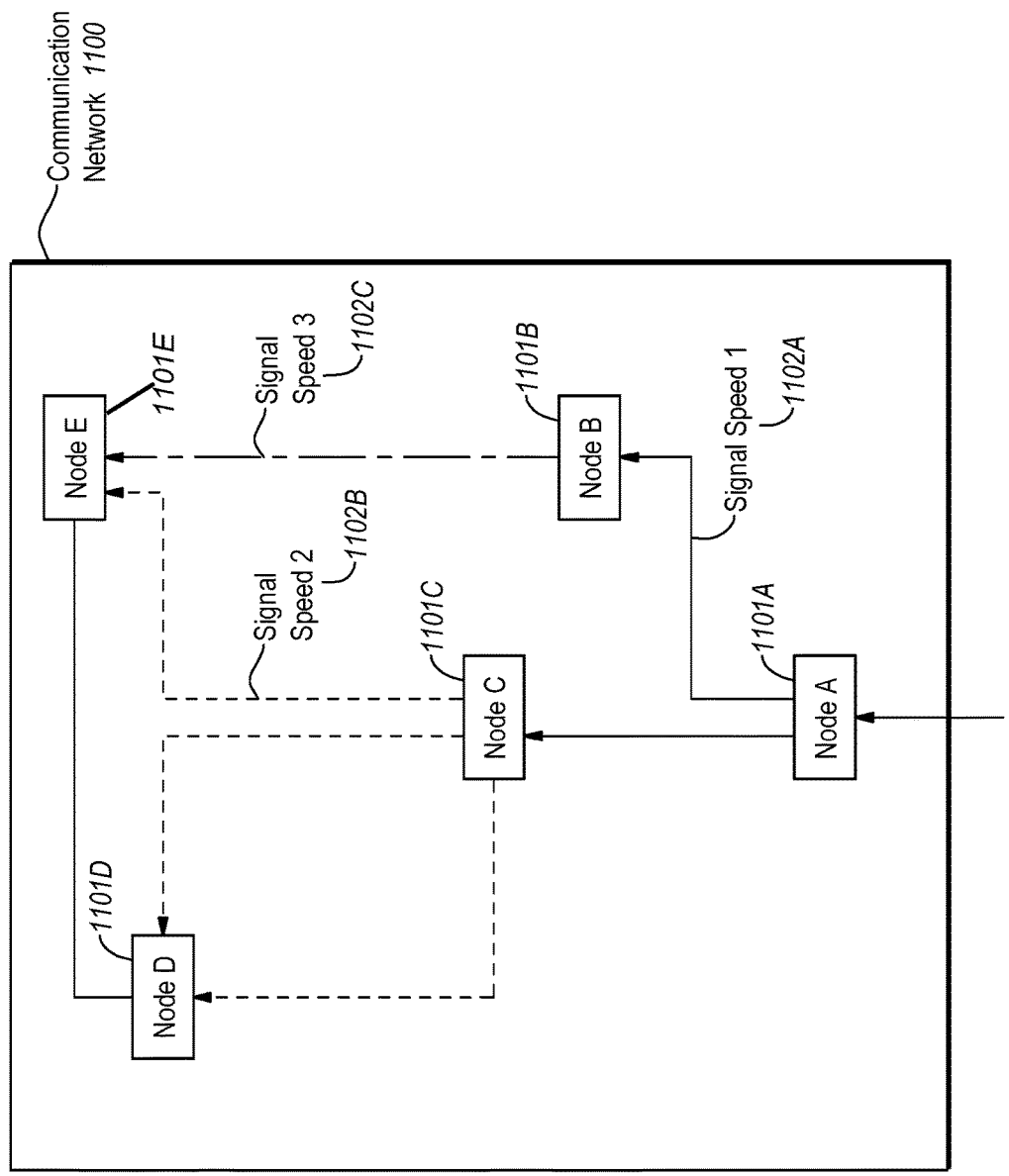
FIG. 11 illustrates an embodiment in which an incoming signal travels through a communication network.

For instance, particles may show data being transferred from a data source through one or more network nodes to a data destination (as is generally shown in FIG. 11). As the data approaches the nodes, it may slow down during the routing process. The particles, in such cases, may also slow down and/or change color to indicate the change in transfer rate. As with RF emissions emitted from antennas, data packets may be represented individually by photons, or a single photon may represent a group of data packets. Each visualization may represent the photons or data packets in a different manner, and each visualization may be customized by the end user if desired. These concepts will be explained further below with regard to method 1200 of FIG. 12.

Figure 12:
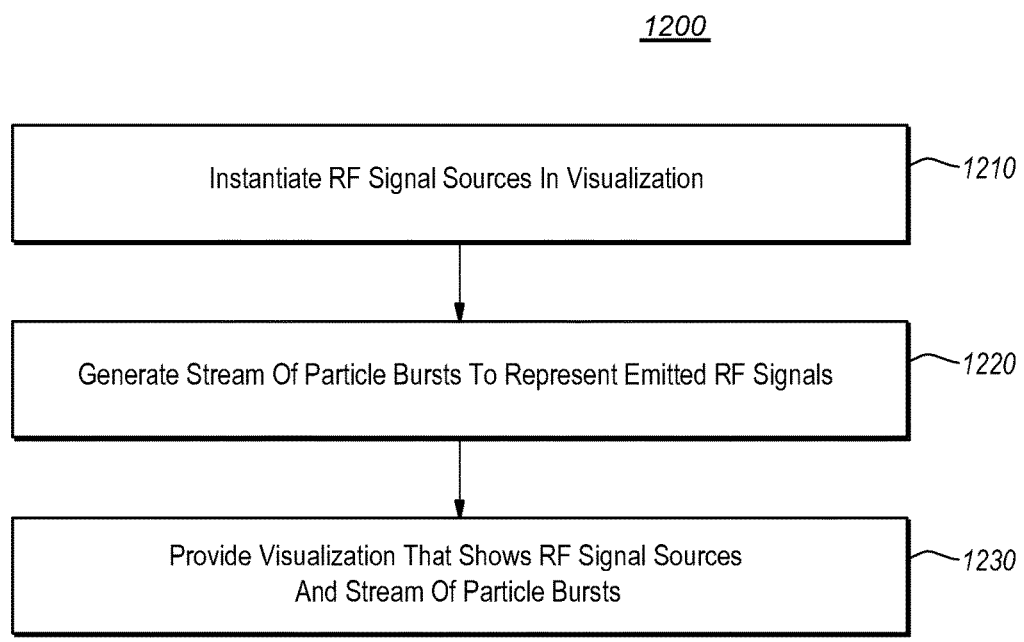
FIG. 12 illustrates a flowchart of an example method for representing RF signals in a visualization using particle streams or bursts.

In view of the systems and architectures described above, methodologies that may be implemented in accordance with the disclosed subject matter will be better appreciated with reference to the flow chart of FIG. 12. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 12 illustrates a flowchart of a method 1200 for representing radio frequency (RF) signals in a visualization using streams or particles or particle bursts. The method 1200 will now be described with frequent reference to the components and data of environment 100 of FIG. 1, as well as communication network 1100 of FIG. 11. Still further, the visualizations 200-1000 of FIGS. 2-10 may also be referred to in the description below.

Method 1200 includes instantiating one or more RF signal sources in a visualization, each RF signal source being configured to emit RF signals (1210). For example, instantiation module 107 of computer system 101 may instantiate RF signal sources 116 within visualization 115. The visualization 115 may be generated using the processor 102 and one or more portions of software code or logic. The visualization 115 may be any type of user interface including a GUI displayed on a touchscreen or monitor, a mixed reality, virtual reality (VR), or augmented reality environment, a projection on a wall or other surface, or some other type of system capable of displaying electronic images. In some cases, the visualization 115 may be an image that is merely displayed and does not facilitate user interaction, while in other cases, the visualization 115 may allow user interaction with one or more of the elements shown therein.

In addition to the RF signal source, the visualization 115 may show a variety of different elements including active elements that may interact with or communicate with the RF signal source (e.g. elements that have their own transmitters or receivers), as well as inactive elements that do not communicate with the RF signal source 116 (e.g. natural elements such as mountains or clouds). The inactive elements may have a tangible effect on the RF signals 117 output by the RF signal source 116. Indeed, mountains may block (partially or entirely) signals coming from a given RF signal source. Clouds may attenuate or diffract signals, reducing their effectiveness. Other elements including rain, city buildings, people, etc. may each have an effect on the transmission of a signal through space.

Accordingly, the visualization generator 108 may take these inactive elements into account when generating (and updating) the visualization 115. The visualization generator may be designed to replicate physical properties of elements as closely as possible, as well as those elements' effects on the RF signals 117 in the visualization 115. Still further, the visualization generator 108 may take into account the effects of active elements within the visualization 115, propagating their effects on the RF signals throughout the visualization. These effects may be seen in real time, and may be shown in the particles transmitted between elements (e.g. between the RF signal source 201 and the airplane 204 of FIG. 2) in the visualization.

Method 1200 next includes generating a stream of particle bursts to represent at least one of the emitted RF signals (1220). The particle burst generator 109 (which may or may not be part of visualization generator 108) may generate a stream of particle bursts 118 that represent at least one of the RF signals 117 emitted by the RF signal sources 116. The stream of particle bursts 118 may include substantially any number of particle bursts, although three (119A, 119B and 119C) are shown in FIG. 1. As illustrated in FIG. 2, the particle bursts 202 may be emitted in many directions, including a primary direction and through antenna sidelobes 203. The particle bursts may be intermittent or continuous. The period at which the particle bursts occur may be changed, for example, by a user (e.g. user 113). In other cases, the particles emitted from the RF signal sources may not be aggregated in bursts, but may be a continuous stream of particles. This continuous stream of particles may be emitted omnidirectionally from the antenna of the RF signal source, or may be emitted in some other fashion (e.g. steered in particular direction by a steered antenna).

Each particle burst (e.g. 119A) may be of a specified length, and may include or represent a specified number of photons. For instance, one particle burst 119A may represent many hundreds, thousands or millions of photons (or more). In other cases, each particle represents a single photon of electromagnetic radiation emitted from a signal source. One will recognize that the degree of aggregation (i.e. the ratio of photons to illustrated particles) may vary in each implementation, and that the ratio may be higher or lower in different visualizations. This ratio may be changed by the user 113 using input 114. As the user changes the ratio of photons to illustrated particles, the number of particles illustrated as coming from an RF source may go up or down as the ratio is adjusted. If one illustrated particle illustrates a large number of photons, fewer particles will be illustrated as coming from the RF signal source, whereas if one illustrated particle illustrates a small number of photons, more particles will be illustrated as coming from the RF signal source.

In some cases, this ratio may be treated differently for different devices. For instance, if the user wishes to minimize particles flowing from one RF source, the user can fine tune the ratio so that one illustrated particle represents many emitted photons. The results of this tuning can be represented dynamically in the visualization 115. As such, the user can adjust the visualization to his or her liking on the fly. This allows such visualizations to be adapted to a wide variety of different scenarios in which RF signals can be illustrated as particles.

Method 1200 also includes providing a visualization that shows the one or more instantiated RF signal sources along with the generated particle bursts representing the emitted RF signals (1230). For instance, the visualization generator 108 may determine how the RF signals 117 emitted by the instantiated RF signal sources 116 are to be represented within the visualization 115, and then generate that visualization to show the RF signal sources along with the stream of particle bursts 118 representing the RF signals 117. The visualization 115 may include multiple different RF signal sources. In some cases, each RF signal source may be emitting RF signals at different rates. For instance, some RF signal sources may have taller or larger antennas that allow for larger signal strengths. Conversely, some RF signal sources (such as cell phones) may run on battery power, and may not have a large signal strength. The visualization 115 may be configured to show different RF signal sources broadcasting at different strengths.

As mentioned above, the RF signal sources may broadcast the RF signals 117 in a variety of different methods and at a variety of different frequencies. Each of these signals may be represented using particles in a different manner. In some cases, each illustrated particle represents a group of photons, while in other cases, each illustrated particle represents a single photon. The illustrated particles themselves may be grouped together into bursts (e.g. particle bursts 202 of FIG. 2), or may be illustrated singly (e.g. particles 702 of FIG. 7). Generating a stream of particle bursts may thus include aggregating the emitted RF signals into groups of particle bursts.

In the visualization, the particle streams or particle bursts may be animated, and may be moving across the user's screen. In order for users to be able to comprehend the visualization, the streams or bursts are illustrated as moving at a speed substantially less than light speed. This allows the user 113 to more clearly see what is happening. Despite the slower speeds, however, the particles may still behave accurate to physics in all other respects, especially with regard to signal interference, attenuation, etc. due to weather or other active or inactive elements in the visualization.

In some cases, specific types of signals are sent out by the RF signal source 116. For example, as in FIGS. 2-10, at least one of the RF signal sources may be a jamming device configured to emit a specific type of RF signals. In such cases, the visualization generator 108 may use various factors to appraise the intensity of the jamming signal and how much jamming margin is available in a given scenario. Other active elements displayed in the visualization may include detectors, mobile devices such as phones, tablets or wearable devices, airplanes, satellites, drones, boats, vehicles, missiles or other objects.

In cases where the photons emitted by an RF signal source are represented using particle bursts (e.g. 202 of FIG. 2), the visualization 115 may further provide graphs that illustrate the particle bursts on a spectrum plot (e.g. 302 of FIG. 3) which is synchronized with the stream particle bursts from the emitter. Thus, as time progresses on the z-axis, signals with intensities above the noise floor are shown as square bursts of energy spread over a specified frequency bandwidth. The square bursts of energy coincide with the stream of particle bursts 202 from the emitter 201. Once the bursts of energy in the spectrum plot 302 reach the end of the graph on the z-axis, they fall off and new energy bursts appear (assuming the signal source is still transmitting). Thus, the spectrum plot 302 may provide useful additional information that can be displayed within the visualization 300.

In one specific embodiment, a computer system 101 is provided that includes the following: one or more processors 102, an instantiation module 107 configured to instantiate RF signal sources 116 in a virtualized anti-access/area denial (A2AD) environment within visualization 115. Each RF signal source in the visualization is configured to emit RF signals 117. The computer system 101 further includes a particle burst generator 109 that is configured to generate a stream of particle bursts 118 to represent at least one of the emitted RF signals 117 in the virtual A2AD environment. The computer system also has a visualization generator 108 that is configured to provide a visualization 115 that shows the instantiated RF signal sources 116 along with the generated particle bursts 118 representing the emitted RF signals 117 in the virtual A2AD environment.

An A2AD environment may be similar to that shown in FIG. 2, with a jamming device 201 and an airplane 204 trying to avoid the reach of the jamming device. The visualization generator 108 may instantiate one or more signal jammers within the virtual A2AD environment. Then, within that A2AD environment, the visualization generator 108 may present a mapped out flight course through the virtual A2AD environment that avoids the signal jammers. This may be very helpful for pilots who are operating the airplanes, as they can visualize how the particles are being emitted from the jammers, and can visualize how to avoid those jamming signals. The visualization generator 108 may be further configured to provide additional functionality in the particle visualization 200 including battlefield management elements, planning elements, flight test observation, playback and simulation in the virtual A2AD environment.

In some cases, the visualization generator 108 may be configured to generate a virtual network operations center (NOC) representing network operations and network devices on a battlefield. The NOC may allow the user 113 to control or change network operations within the network devices on the battlefield, visualizing the communications coming from each network device via the stream of particle bursts 118. Indeed, the visualization generator 108 may illustrate animations in the NOC to show network communications using particles, where each particle represents one or more data packets. This concept will be described further below with relation to FIGS. 1 and 11.

FIG. 11 illustrates an embodiment in which data packets are represented as particles in a communication network 1100. These data packets may be any type of data packet, including voice, video, or web (e.g. TCP/IP) data, and each packet may be substantially any size. The data packets may be transmitted from a signal source 1103 to one or more network nodes 1101A-E. Each network node may apply some type of processing including routing, inspection, tracking, filtering or other form of processing. This processing may slow the network nodes down, at least to some degree, which reduces the rate of flow through the nodes. Accordingly, the incoming signal source 1103 may provide an incoming signal to the communication network 1100 which may initially be sent to Node A (1101A).

That incoming signal may then be routed through one or more of the other nodes, depending on which node is the destination for the signal's corresponding data packets. As shown in FIG. 11, the transmissions between nodes may occur at different speeds, as indicated by the different types of connecting lines. It will be understood, of course, that the actual signals are transmitted at the speed of light or very close to it. The different rates of transmission occur, however, due to slowdowns in the nodes themselves, thus translating to a longer transfer time between nodes.

In one specific example, a user interface is provided to show the communication network. A computer program product may be used to generate the user interface (e.g. visualization 115 of FIG. 1). The computer program product includes at least one computer-readable storage device having stored thereon computer-executable instructions that, when executed by processor 102 of computing system 101, cause the computing system to instantiate the user interface. The user interface includes a communication network 1100 that itself includes multiple different network nodes 1101A-E and communication signals that transmit data packets at different signal speeds 1102A-C. The communication signals travel between origin and destination nodes through other nodes of the network 1100. The communication signals include data packets that may include data usable for a wide variety of different purposes.

The user interface of this embodiment also includes multiple inter-node communication pathways configured to carry the communication signals (117 of FIG. 1) from the respective origins to the respective endpoints through the different network nodes 1101A-E. In the user interface, the data packets are represented as particles. As such, the particles are visualized as traveling from origin to destination endpoints through the network nodes. As with the photons emitted from the RF signal sources 116 in FIG. 1, each particle illustrated in FIG. 11 may represent a single data packet, or may represent a plurality of data packets. This ratio of data packets to illustrated particles may be increased or decreased as desired, and perhaps based on input 114 from user 113.

In some cases, different properties of the particles illustrated in the user interface are represented as different attributes of the data packets. For example, a certain color such as blue may be used to represent voice data packets. As such, in the visualization/user interface, voice data packets would be illustrated as blue particles. Other types of data packets may be represented using other colors. Still further, other attributes such as packet size may be indicated using color, symbols, differently sized particles, or otherwise illustrated such that data packets of a certain type are easily visible in the user interface.

Different signal speeds (e.g. 1102A-C) may also be illustrated in different colors. For example, data packets that are being routed quickly (e.g. signal speed 1 (1102A)) may be illustrated as green particles, indicating that they are moving in an efficient manner through the network nodes. Alternatively, yellow or red particles may be used to represent data packets moving at slower speeds. As such, data packets moving at signal speed 2 (1102B) may be illustrated as yellow particles, and data packets moving at signal speed 3 (1102C) may be illustrated as red particles, indicating that they are moving substantially slower through the network than other particles. Using this embodiment, a user can clearly see fast- and slow-moving particles, and see where traffic jams are occurring within the communication network 1100.

In some cases, even though a particle has been assigned a specific color at one point in time, that color may later be changed. For instance, if the particle is traveling through a slow portion of the network, it may be assigned a red color. Then, upon passing through to another high speed portion of the network, the color assigned to the particle may be dynamically changed to green. Accordingly, particles in the user interface may be continually updated as conditions (e.g. time of travel through the nodes) changes. These changes can be updated at a fixed, periodic rate, or on an ad hoc basis as selected by the user 113.

When data packets are dropped, as often occurs in a wired or wireless communication network, they can also be represented in the user interface using particles. In some cases, the dropped data packets can be illustrated as particles having trajectories that follow the normal signal path up until they are dropped, at which point the trajectories may veer off the normal signal path and into a dropped packet pool, or into another portion of the user interface, or off of the user interface altogether. If data packets are being repeatedly dropped between two nodes, the user may be able to easily see the packets being dropped (their representative particles may also take on a different color uniquely identifying them as dropped packets), and attempt to find a fix to the problem.

Although a small network of five nodes is illustrated in FIG. 11, it will be understood that substantially any number of nodes may be shown in a user interface. Still further, it will be understood that different types of wired and wireless connection paths may be used between nodes indiscriminately, and that signal speed may be different between each node, and may change over time based on different conditions. If at any given point of time, nodes become overloaded, for example, particles representing data packets may begin to pile up at those nodes and change colors perhaps to red. As such, the flow of data packets may appear similar to a vehicle traffic jam on an interstate or at an intersection. The illustrated particles may behave in a manner that clearly conveys to the user what is happening with the data packets at each node.

It should be further noted that the communication network 1100 itself may be changed by the user 113. At least in some embodiments, user 113 may provide input 114 to the representation of the communication network 1100 which changes one or more elements of the network. For instance, the user 113 may be able to add or remove nodes from the network. Still further, the user 113 may be able to rearrange the positions of at least some of the network nodes. By rearranging the nodes, the user may be able to discover more efficient routings by avoiding or reducing interference between nodes. Users may also be able to select certain nodes or certain particles to find out more information about those nodes or particles. For instance, selecting a node might give information about what type of node it is, what types of data it handles, what other nodes it is connected to, etc. Selecting a particle may provide information about the underlying data packet including its origin, destination, time of travel, currently assigned color, previously assigned colors, or other information.

Thus, in this manner, the user interface may be fully interactive, and may allow a great deal of customization by a user. The user interface may be used to display a wide variety of different scenarios in which data packets are transferred including wired and wireless communication networks, as well as within a computer system (e.g. between a hard drive and a processor). By representing data packets as particles in a visualization or user interface, a clear picture of data packet travel may be provided to a user.

Accordingly, methods, systems and computer program products are provided which allow representation of RF signals in a visualization using particles, streams of particles and in some cases, particle bursts. These visualizations allow users to see and understand what are otherwise invisible RF and data transmissions between systems. The visualizations thereby provide insight and light to systems which can then be used to improve the functionality of those systems.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A method, implemented at a computer system that includes at least one processor, for representing radio frequency (RF) signals in a visualization using particle bursts, the method comprising:
   instantiating one or more simulated RF signal sources in a visualization, each RF signal source being configured to emit RF signals;
   generating a stream of particle bursts to represent at least one of the emitted RF signals; and
   providing a visualization that shows the one or more instantiated simulated RF signal sources along with the generated particle bursts representing the emitted RF signals.

2. The method of claim 1, wherein the visualization includes a plurality of simulated RF signal sources, each simulated RF signal source emitting RF signals at different rates.

3. The method of claim 1, wherein generating a stream of particle bursts comprises aggregating the emitted RF signals into groups of particle bursts.

4. The method of claim 3, wherein the particle burst groups include a specified amount of RF signal photons.

5. The method of claim 1, wherein the visualization illustrates one or more jamming devices configured to emit a specific type of RF signals.

6. The method of claim 1, wherein the visualization illustrates one or more RF signal detection devices configured to detect RF signals and RF signal reflections.

7. The method of claim 1, wherein providing a visualization further comprises displaying the particle bursts on a spectrum plot which is synchronized with the stream particle bursts from the emitter.

8. A computer program product comprising at least one computer-readable storage device having stored thereon computer-executable instructions that, when executed by one or more processors of the computing system, cause the computing system to instantiate a user interface comprising the following:
   a communication network comprising a plurality of network nodes and communication signals, wherein the communication signals travel between origin and destination endpoints, the communication signals comprising data packets; and
   a plurality of inter-node communication pathways configured to carry the communication signals from the respective origins to the respective endpoints through the plurality of network nodes, wherein the data packets are represented as particles in the user interface, such that the particles are visualized as traveling from origin to destination endpoints through the network nodes.

9. The computer program product of claim 8, wherein different properties of the particles are represented as different attributes of the data packets.

10. The computer program product of claim 9, wherein data packets of a first type are illustrated as having a first color, and data packets of a second, different type are illustrated as having a second, different color.

11. The computer program product of claim 10, wherein the assigned colors change dynamically based on the speed of the data packet, thereby indicating which network nodes are faster or slower.

12. The computer program product of claim 10, wherein particles at inefficient nodes are illustrated as backing up, thereby allowing data traffic jams to be visualized.

13. The computer program product of claim 9, wherein dropped data packets are illustrated as falling from the communication network.

14. The computer program product of claim 9, wherein the user interface illustrated allows network nodes to be moved to avoid or reduce interference.

15. A computer system comprising the following:
one or more processors;
an instantiation module configured to instantiate one or more RF signal sources in a virtualized anti-access/area denial (A2AD) environment, each RF signal source being configured to emit RF signals;
a particle burst generator configured to generate a stream of particle bursts to represent at least one of the emitted RF signals in the virtual A2AD environment; and
a visualization generator configured to provide a visualization that shows the one or more instantiated RF signal sources along with the generated particle bursts representing the emitted RF signals in the virtual A2AD environment.

16. The computer system of claim 15, wherein the visualization generator is further configured to provide additional functionality in the particle visualization including battlefield management elements, planning elements, flight test observation, playback and simulation in the virtual A2AD environment.

17. The computer system of claim 15, wherein the visualization generator is further configured to generate a virtual network operations center (NOC) representing network operations and network devices on a battlefield.

18. The computer system of claim 17, wherein the visualization generator illustrates one or more animations in the NOC to show network communications using particles, each particle representing one or more data packets.

19. The computer system of claim 15, wherein the visualization generator instantiates one or more signal jammers within the virtual A2AD environment, and further presents a mapped out flight course through the virtual A2AD environment that avoids the signal jammers.

20. The computer system of claim 19, wherein the visualization generator determines how many particles are emitted by each signal jammer, and which flight course results in a minimal amount of particles coming into contact with an aircraft.

\* \* \* \* \*